United States Patent [19]

Mudrovich

[11] Patent Number: 5,197,795
[45] Date of Patent: * Mar. 30, 1993

[54] ADJUSTABLE-LENGTH REMOVABLY-MOUNTABLE HOLDER SYSTEM

[75] Inventor: George Mudrovich, Richardson, Tex.

[73] Assignee: Gruhn USA, Inc., Richardson, Tex.

[ * ] Notice: The portion of the term of this patent subsequent to Nov. 13, 2007 has been disclaimed.

[21] Appl. No.: 606,445

[22] Filed: Oct. 31, 1990

Related U.S. Application Data

[63] Continuation-in-part of Ser. No. 374,456, Jun. 30, 1989, Pat. No. 4,970,630.

[51] Int. Cl.$^5$ .............................................. B62J 6/00
[52] U.S. Cl. ...................................... 362/72; 362/184; 362/191; 362/198; 280/288.4
[58] Field of Search ................. 280/288.4, 201; 224/30 R, 31, 39, 40; 315/76; 322/1; 362/72, 61, 191, 198, 199, 202, 205, 368, 369, 370

[56] References Cited

U.S. PATENT DOCUMENTS

| | | | |
|---|---|---|---|
| 2,299,762 | 10/1942 | McDermott | 322/1 |
| 2,944,833 | 7/1960 | Wintermantel | 280/288.4 |
| 3,851,166 | 11/1974 | Kohler | 362/198 |
| 4,443,831 | 4/1984 | Godfrey | 362/198 |
| 4,598,339 | 7/1986 | Ainsworth | 280/288.4 |
| 4,970,630 | 11/1990 | Mudrovich | 362/72 |

FOREIGN PATENT DOCUMENTS

| | | | |
|---|---|---|---|
| 0590118 | 6/1925 | France | 224/30 R |
| 0798405 | 1/1981 | U.S.S.R. | 362/369 |
| 0745183 | 2/1956 | United Kingdom | 362/72 |

Primary Examiner—Ira S. Lazarus
Assistant Examiner—Alan B. Cariaso
Attorney, Agent, or Firm—Winstead Sechrest & Minick

[57] ABSTRACT

The present invention relates to an adjustable-length removably-mountable integral holder system having an elongate holder body which includes a first entry located at its forward end and a second opening located at its rear end. One or both ends of the body may possess means for mounting or connecting one or more auxiliary lighting units. Each end of the housing includes means for engaging a structural member. The length of the housing can be axially adjusted to allow removable mounting of the system between the structural members of a vehicle and to accommodate different mounting spaces. The elongate housing includes at least two sections which are axially extendable with respect to one another and further can be spring biased to allow compression of the spring when one end of the housing is moved toward the other for producing a force of securement when the housing is positioned in a space between two structural members which space is smaller than the overall length of the housing in an uncompressed state.

33 Claims, 7 Drawing Sheets

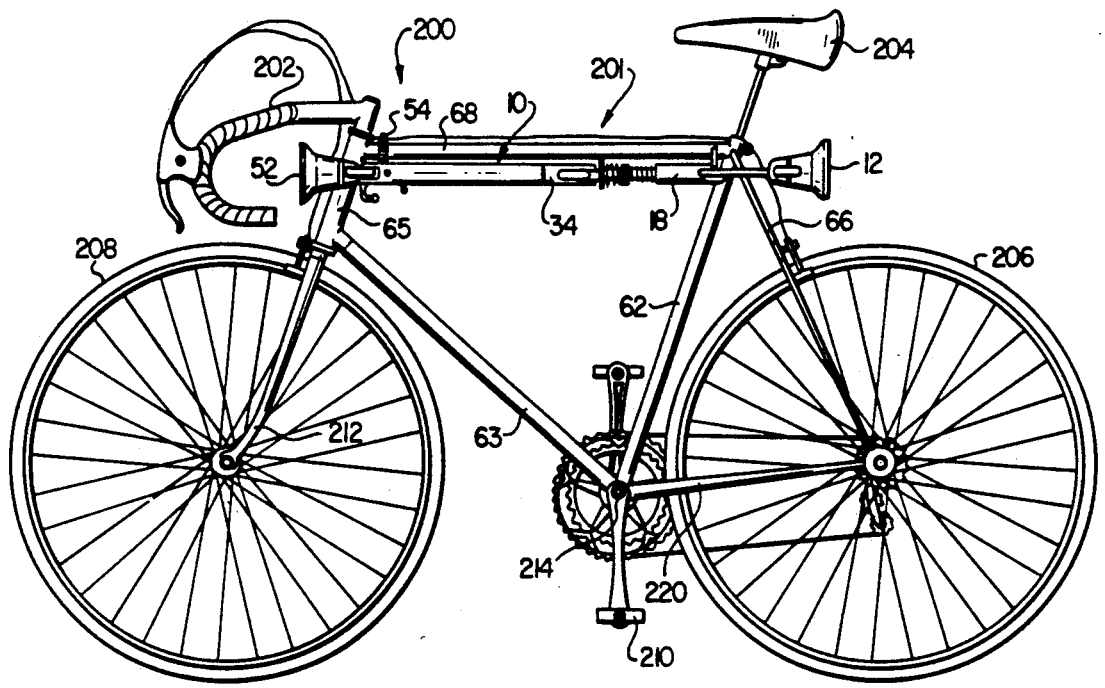
FIG. 1
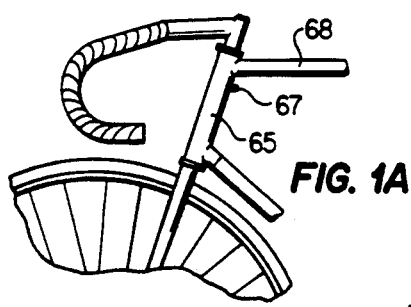
FIG. 1A
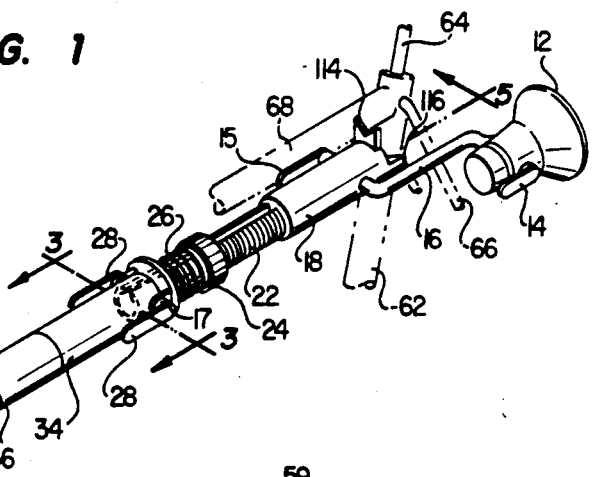
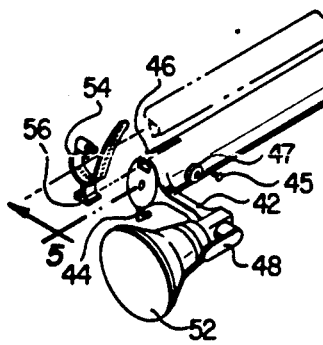
FIG. 2
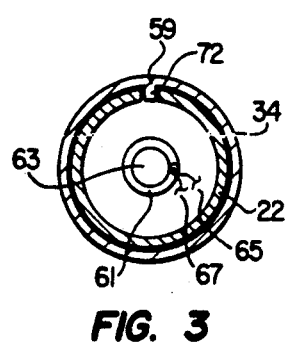
FIG. 3

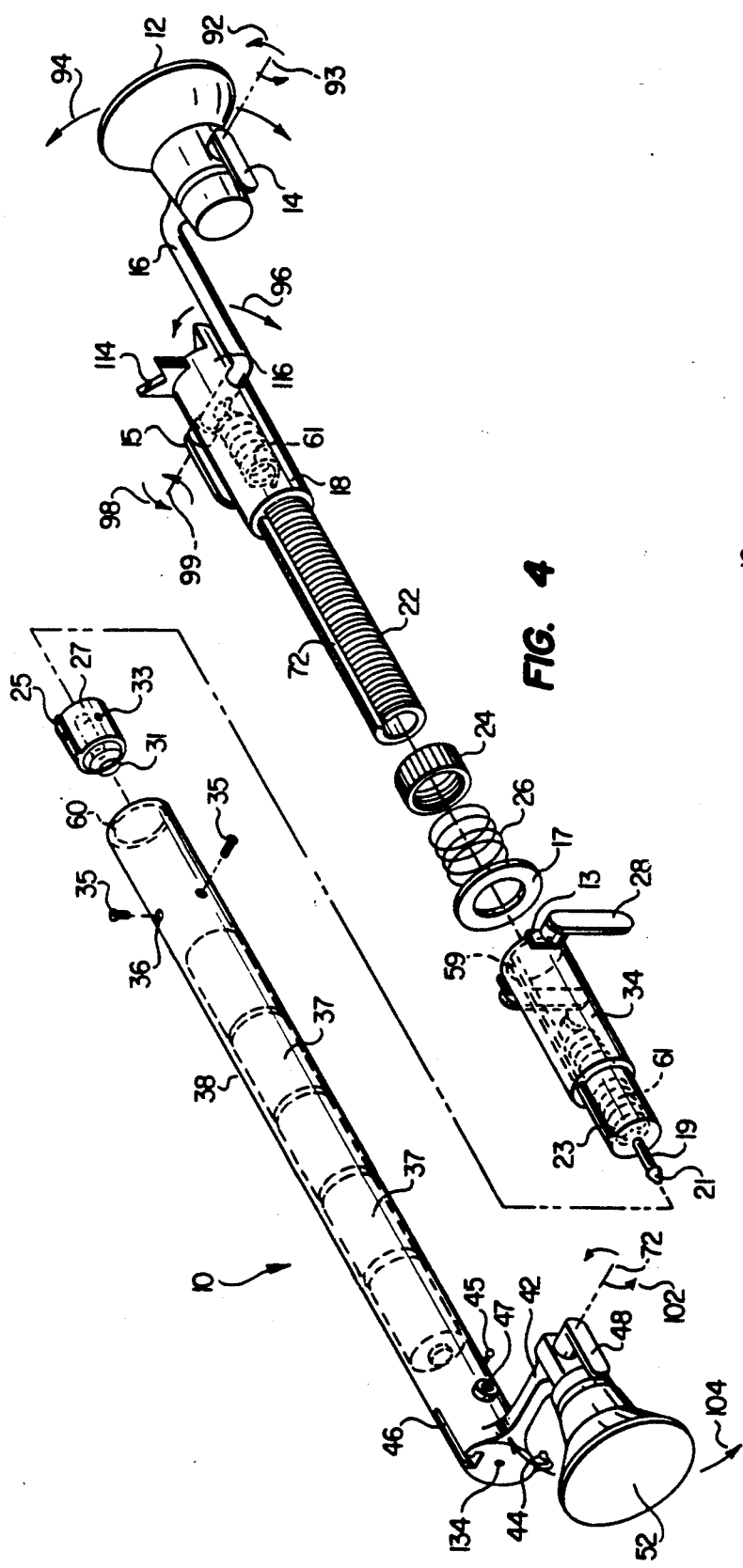
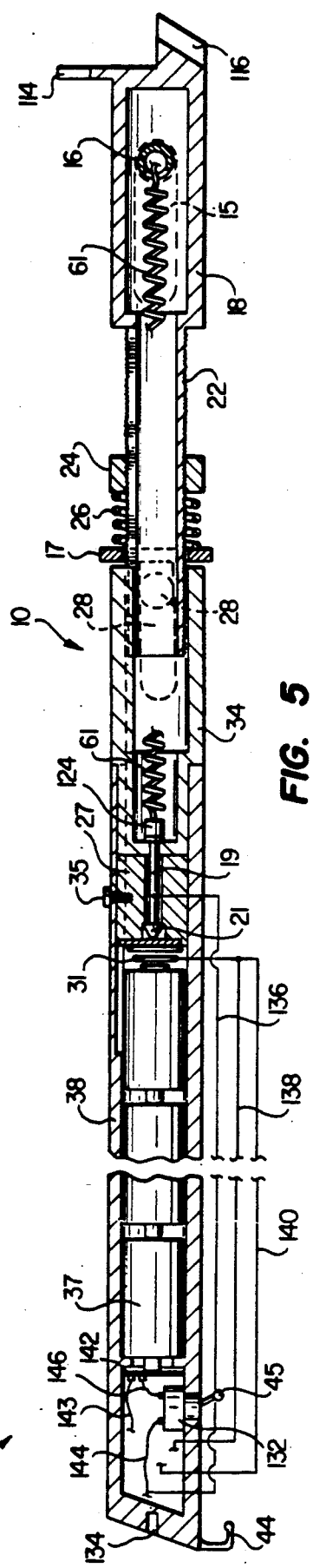
FIG. 4
FIG. 5

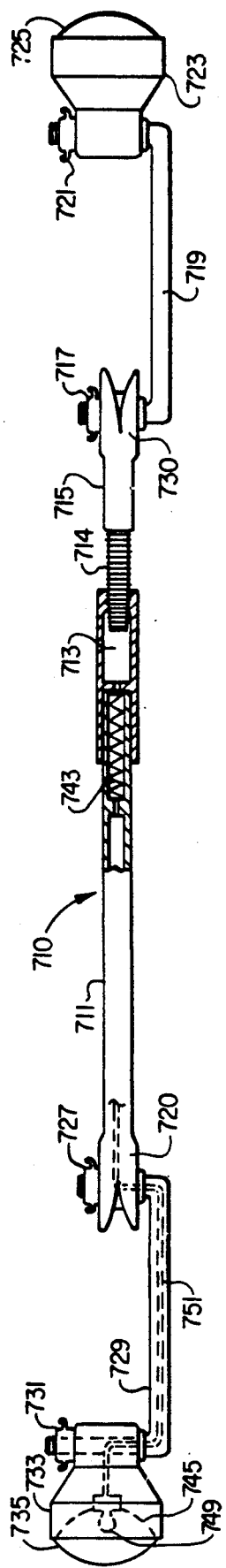

ADJUSTABLE-LENGTH REMOVABLY-MOUNTABLE HOLDER SYSTEM

This is a continuation-in-part application of U.S. application Ser. No. 07/374,456, filed Jun. 30, 1989, now U.S. Pat. No. 4,970,630 which is hereby incorporated by reference in its entirety.

FIELD OF THE INVENTION

The invention relates to an adjustable-length removably-mountable holder system and, more particularly, to a clampless/screwless removable and adjustable-length holder system for bicycles capable of functioning as a lighting system or carrying the rider's small personal articles or batteries for a bicycle lighting assembly.

BACKGROUND OF THE INVENTION

Bicycle lighting systems that are operable from batteries or miniature generators are well known in the art. Most bicycle lighting systems consist of a headlamp for providing adequate light to illuminate the path that lies ahead of the bicycle. Other known bicycle lighting systems may also include a high-visibility tail lamp to indicate the presence of the bicycle to vehicles that are following the bicycle. Moreover, bicycle lighting systems are required safety devices for people bicycling at dusk or in darkness. Such lighting devices must be lightweight so as not to add too much weight to the bicycle and are also preferably aesthetically pleasing.

One limitation of prior art bicycle lighting systems is that most assemblies require permanent attachment to the bicycle frame. Thus, the separate headlight, taillight, and power supply, all remain fixed to the frame even during daytime hours, thereby adding extra weight and bulk to the bicycle. Such systems are also limited in their usefulness; the battery receptacle, for example is only adapted to hold batteries. In addition, the current systems are time consuming to install and/or remove further adding to the narrow adaptability of the systems.

For example, U.K. Patent No. 13,344 to Harton describes a bicycle lighting system including separate electric head and tail lamps. The headlamp is secured to the bicycle head tube near the handle bar, while the tail lamp is attached to the seat stay. A batteries box and control switches assembly are secured to the frame of the cycle by means of clips or straps. The battery box cannot expand and has limited carrying capacity.

In U.S. Pat. No. 1,439,430 to Lyhne, it is taught battery covers for supporting and protecting batteries to be used for lighting on a bicycle. The battery container includes a clamping means welded to the casing for attachment to a bicycle frame. The clamp is further secured by use of a clamp screw. No expansion or contraction of the device is required for attachment to the bicycle.

U.S. Pat. No. 3,894,281 to Bloomfield teaches a vehicle lighting system that utilizes both generating means and battery means to provide constant lighting whether the bicycle is moving or not. Each part of the assembly requires clamp and bracket mounts for rigid attachment to the bicycle.

U.S. Pat. No. 4,019,171 to Martelet teaches a velocity-responsive lighting system including light means that are periodically illuminated in sequence for a period determined by the velocity of the vehicle. The switch and circuit assembly is secured to the horizontal top tube of the bicycle. While the rear light assembly is secured to the rear fender by a U-shaped bracket. The magnetically responsive switch assembly is attached to a seat stay support member.

U.S. Pat. No. 4,555,656 to Ryan discloses a generator and rechargeable battery system for a bicycle. The battery system is rigidly secured to the seat tube of the bicycle by means of a conventional bracket. The headlamp is separately mounted to the handle bar while the tail lamp is attached to the rear "mud-guard" of the bicycle.

Other single lamp bicycle layout systems have been constructed to be removable. For example, U.S. Pat. No. 1,848,235 to Wiley discloses a lamp mounting which is detachably securable to a mud guard of a bicycle or a motorcycle. The bracket readily conforms to the contour of mud-guards of various shapes and dimensions. The device provides a releasable clamping member by which the mounting may be firmly secured against displacement on a mud-guard without requiring the drilling of holes on the mudguard.

U.S. Pat. No. 4,204,191 to Daniels discloses a bicycle lighting system which provides a turn indication feature. The housing for the battery power and the circuit is removably mounted upon the seat tube by use of clip fasteners. The headlamp, the tail lamp, and the indicator lamp are each separately secured to other parts of the bicycle. Similarly, Spingler in U.S. Pat. No. 4,325,108 teaches a rechargeable battery unit that is removably attached to a bicycle by means of a releasable clamp bolt. The device includes a transfer switch to permit selective energizing of a headlamp and/or tail lamp from a battery or from a generator.

None of the illustrated prior art bicycle lighting systems discussed includes a lighting assembly whereby the battery pack attaches to the bicycle without the use of clamps and/or screws. In each of the prior systems, the power supply, whether removably attached or permanently affixed requires the use of clamps or screws. The present invention overcomes many of the disadvantages of known bicycle lighting power packs by utilizing a single power receptacle that is secured to the bicycle frame through wedging pressure; the receptacle expands or contracts and is wedged between the bicycle frame tubes. Because of its construction the present invention can be adjusted over a wide range of length. This provides a custom fit for any bicycle frame and further allows a simplified means of attachment and removal. Such a system can be mounted to the bicycle when it is needed and removed and safely stored when it is not. Thus, little or no extra weight remains attached to the bicycle when the lights are not needed. Further, the holder system alternatively functions as a storage unit, allowing the rider to place maps, money and a variety of other essentials in the holder when the lights are not in use. Moreover, the present invention can be completely removed from the bicycle to prevent theft of the system when the bicycle is left locked but unattended. The present holder system is portable and can be secured in a backpack or briefcase.

The specific construction of the present assembly allows for alternative methods of attachment to the bicycle, thus enabling the rider to mount other objects to the bicycle as well. For example, a tire pump mounted on the top tube and a water bottle mounted to the seat tube does not hinder the attachment of the present invention. By permitting a bicycle user to accommodate other accessories, in addition to the holder system the rider can receive more enjoyment and safety from the bicycle.

SUMMARY OF THE INVENTION

Therefore, it is an object of the present invention to provide an adjustable-length removably-mountable holder system that fits within the frame of a bicycle and is capable of functioning as a lighting system.

It is another object of the present invention to provide an adjustable-length removably-mountable holder system that fits within the frame of a bicycle, when the holder system permits the bicycle rider to store assorted articles therein while riding the bicycle.

It is yet another of the present invention to provide an adjustable-length removably-mountable holder system that interfaces with a lighting system that may be removably mounted to the support system.

It is still another object of the present invention to provide an adjustable-length removably-mountable support system that can carry batteries for an ancillary bicycle lighting system.

In one aspect, the present invention is an adjustable-length removably-mountable holder system which includes an elongate hollow assembly for receiving an object. The elongate hollow assembly has a forward portion and a rearward portion. A means for connecting the elongate hollow assembly with an ancillary lighting is provided. In addition, the elongate hollow assembly includes a means for removably securing the elongate hollow assembly to a structural frame unit. The elongate hollow assembly can also include power supply electrical connections mounted inside the elongate hollow assembly which is adapted for receiving at least one battery. The elongate hollow assembly can further include an electrical socket which couples with the ancillary lighting member. The electrical socket interconnects with the power supply electrical connections and can be further provided with a manually actuatable switch. The length of the holder is adjustable in a forward and a rearward axial direction by way of a threaded length adjuster and/or a spring means. The length adjustment permits mounting of the holder between structural frame units of bicycles of various sizes.

In another embodiment, the invention includes an adjustable-length removably-mountable holder for a bicycle that is mounted on the tubular frame units of a bicycle. The holder includes an elongate hollow assembly for receiving an object, such as a battery, as well as means for connecting the hollow assembly with an ancillary lighting member. The elongate hollow assembly may be removably secured within a defined area of the tubular frame unit of a bicycle.

In yet another embodiment, the invention is an adjustable-length removably-mountable holder for a bicycle. The holder includes an elongate hollow assembly equipped with means for receiving a battery and means for electrically connecting the battery to an ancillary lighting system. The holder further includes means for removably securing the elongate hollow assembly to a bicycle frame by axially adjusting the hollow assembly so as to wedge the hollow assembly between the bicycle frame units. The ancillary lighting system includes a forward and a rearward lighting assembly which are independently mounted to the forward and rearward portions of the hollow assembly, respectively.

In yet another embodiment, the invention includes a tubular elongate hollow assembly comprising a rotatably-operating length adjustor and an axially extending attachment means. The hollow assembly further includes an anterior and a posterior engaging block that extends from the attachment means which provides a wedged securement of the hollow assembly to the structural frame unit. The attachment means can include a compression type spring which is actuated by a cam lever, thereby providing firm securement for the assembly. An ancillary lighting member is provided with means for connecting the lighting member to the elongate hollow assembly. The connection of the lighting member to the hollow assembly is accomplished through a conduit that is rotatably secured to the hollow assembly. The conduit encases the electrical interconnection between the batteries within the hollow assembly and the lighting assembly.

In yet another embodiment, the invention is provided with a female T-slot which extends along the elongate hollow assembly and engages a male T-slot clamp which protrudes from the bicycle frame member.

In still yet another embodiment, the invention includes an adjustable-length removably-mountable support system for a lighting assembly which includes a first and a second elongate section axially movable with respect to one another. The first and second sections can be, but not necessarily, spring biased to allow compression of the spring when the first section is moved towards the second section thereby providing the necessary force of securement when the system is positioned in a space smaller than the overall length of the system in an uncompressed state and the space is between two bicycle structural members.

In yet another embodiment, the system is defined by a first, a second and a third tubular section which are interconnected by way of a longitudinally adjustable rotatable linkage. The first tubular section matingly inserts into the second tubular section. A threaded tubular extension is integrally formed with the third tubular section and the second tubular section is internally threaded for the receipt of the threaded tubular extension. The length of the system is adjusted by rotating the third tubular section within the second tubular section such that the overall length of the system may be stretched to wedgingly fit within the frame of a bicycle.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a side plan view of a bicycle having a removably-mountable integral bicycle lighting mounted along and under its horizontal top tube;

FIG. 1A is a partial side view of the head tube of a bicycle illustrating a feature related to mounting of the lighting system;

FIG. 2 is a perspective view of one embodiment of a removably-mountable integral bicycle lighting system;

FIG. 3 is a cross-sectional view taken along line 3—3 of FIG. 2;

FIG. 4 is an exploded perspective view of the removably-mountable integral bicycle lighting system of FIG. 2 illustrating some of the internal components of a removably-mountable integral bicycle lighting system;

FIG. 5 is a cross-sectional view taken along line 5—5 of FIG. 2;

FIG. 13 is a perspective view of the adjustable-length removably-mountable bicycle lighting system shown in FIG. 12;

FIG. 15 is a side plan view of a bicycle having mounted to its and under the horizontal top tube frame one embodiment of an adjustable-length removably-mountable compartment for use with bicycles.

DETAILED DESCRIPTION OF THE PREFERRED EMBODIMENT

Figure 6:
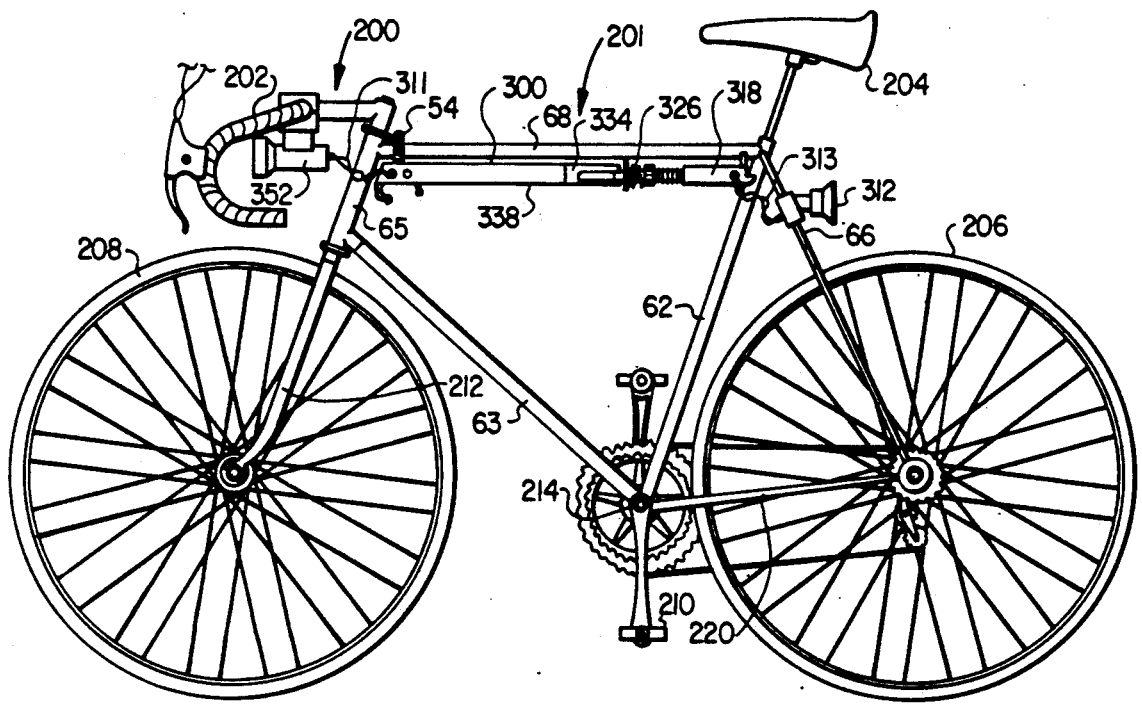
FIG. 6 is a side plan view of a bicycle having an adjustable-length, removably-mountable holder system constructed with the principles of the present invention mounted along and under the bicycle's horizontal top tube and adapted for use with front and rear lights.

The present bicycle lighting system is adapted for removable inclusion on most types of modern bicycles or similar riding conveyors. The term "holder system" as used herein denotes various style components for carrying articles, batteries or ancillary lighting members.

Referring first to FIG 1, there is shown a conventional modern bicycle 200 which includes a frame 201, a pair of handle bars 202, a seat 204 a pair of wheels 206 and 208 and pedals 210 adapted for driving the rear wheel through a chain and sprocket mechanism. The frame 201 consists of a top tube 68, to which a head tube 65 and seat tube 62 are integrally attached. A down tube 63 is attached at the lower rear portion of the head tube 65. At the juncture of the down tube 63 and seat tube 62 is the bottom bracket 214 which mounts the pedals 210 and drive sprocket mechanism. The front wheel 208 is mounted between a front fork 212, which is attached to the handle bars 202 for steering. Two seat stays 66 extend downward and backward from the seat tube 62 on either side of the rear wheel 206. Two chain stays 220 extend backward from the bottom bracket 214 on either side of the rear wheel 206. The rear wheel's axle is mounted at the junction of the chain stays 220 and seat stays 66 on either side of the rear wheel 206. As seen in FIG. 1A, certain bicycles include a tire pump peg 67 formed on the rear of the head tube 65 for use in mounting a tire pump to the frame of the bicycle. As can be seen in FIGS. 1 and 1A many modern bicycles have no mudguards covering the wheels of the bicycle thus limiting the mounting location for bicycle lighting systems for use on the bicycle.

Referring to FIG. 1, there is shown a side plan view of a bicycle having mounted along its horizontal top tube 68 a removably-mountable integral bicycle lighting system 10. The bicycle lighting system 10 is situated between the head tube 65 and the seat tube 62 and, in this embodiment, is mounted on the top tube 68 using an auxiliary clamp 54. For a bicycle that is equipped with a tire pump peg, as illustrated in FIG. 1A, the auxiliary clamp 54 is not needed to mount the lighting system 10 onto the bicycle, as will be further discussed below.

As can be seen from FIG. 1, the lighting system 10 includes an elongate tubular assembly formed of a battery chamber 38 which is closed at the rear end by an internal contact plug 27 (not shown). The forward end of the tubular assembly mounts a head lamp 52, which is attached by a holder 42 which allows adjustment of the headlamp angle and, thus, the angle of the light shining in front of the bicycle 200. A battery pack end cap 34 is inserted into the battery pack 38. An electrical contact post 21 or 19 (not shown) on the forward end of the battery pack end cap 34 is inserted into the rearward end of the internal contact plug 27 (not shown). Cap 34 is affixed to a cylindrical rear mount 18 by means of a spring biased adjustable spring clamp means (not shown). Spring clamp means recesses to secure the tubular assembly just below the top tube 68 of the bicycle 200, wedged between the head tube 65 and the seat tube 62 by the force of the spring bias. Affixed to rear mount 18 is a conduit 16 which mounts a tail lamp 12. The angle of tail lamp 12 may be adjusted by rotating it on the rear end of conduit 16.

Referring now to FIG. 2, there is shown a perspective view of one embodiment of a removably-mountable integral bicycle lighting system 10 along with fragmentary portions of the horizontal top tube 68 of a bicycle. A first, or forward, lighting assembly comprises a headlamp holder or conduit 42, a headlamp angle quick release lever 48, and a headlamp 52. In this particular embodiment, an auxiliary tire pump peg 44 is fitted along the underside of the battery pack 38. Furthermore, a recess 134 adapted to engage a bicycle frame tire pump peg 67 (not shown) is provided on the frontal surface of the battery pack 38. A female portion 46 of a T-slot mounting is also formed along the upper side of the battery pack 38. As shown in FIGS. 1 and 2, the front end of the lighting system 10 can also be held to the bicycle to the top tube 68 by a T-slot clamp 54 which mounts the male portion 56 of the T-slot mounting sliding engagement with the female portion 46 of the T-slot mounting. Clamp 54, thus, serves to hold the front end of the lighting system 10 to the top tube 68. The front of the lighting system 10 butts up against the back of the head tube 65 (as shown in FIG. 1) so that there is no transverse pressure of the lighting system or device 10 against the T-slot clamp 54, since the male T-slot clamp 54 is not all the way into the female portion 46 of the T-slot and does not contact the rearmost portion of the female T-slot. Near the front and on the underside of the battery chamber or pack 38 is an on-and-off toggle switch 45 which is connected to enable manually actuating both the headlamp 52 and the tail lamp 12. Also provided near the rear of the battery chamber 38 are screw holes 36 for receiving threaded screws to fasten the battery chamber 38 to the internal contact plug 27 (not shown) as discussed below inside the battery chamber 38. Beneath and the front or forward portion of the battery chamber 38 is a battery recharger receptacle 47. The batteries mounted within the battery chamber 38 can be recharged by means of household current (via a transformer) connected to the system through this receptacle 47.

Still referring to FIG. 2, the middle assembly of the lighting system 10 includes a battery housing for receiving a plurality of longitudinally abutting and series connected direct-current batteries. Although conventional cylindrical, D-size dry cell batteries are shown, other sizes, shapes and types of batteries could be used. At the rear of the middle assembly are a washer 17 and two cam levers 28. In use, one terminal of each cam lever 28 abuttedly engages the surface of the washer 17. Spring 26 allows for misadjustment of the length of the elongate lighting system 10. Directly rearward from the battery pack 38 is the battery pack end cap 34.

Rearward from the washer 17 is the second or rear lighting assembly comprising a compression-type spring 26 followed by an internally threaded washer 24. The internally threaded washer 24 fits over a threaded shaft 22 comprising a length adjuster which can be screwed in and out along the horizontal axis of the lighting system 10. Firmly attached on the rearward portion of the threaded shaft 22 is the rear mount 18. The rear mount 18, the quick release lever 15, the tail lamp holder 16, and the tail lamp 12, together with the quick release lever 14 for adjusting tail lamp angle make up the remainder of the rear lighting assembly. FIG. 2 shows that the rear mount 18 is positioned abuttedly against the front surface of the seat tube 62 via a lower V-block 116. The upper V-block 14, in turn, abuttedly engages the rear underside of top tube 68.

Alternatively, the battery chamber 38 can be positioned to the rear and underneath the longitudinal axis (along line 5—5 of FIG. 2) of the bicycle lighting system 10. In this fashion the overall length of the bicycle lighting system 10 can be greatly expanded and retracted. As a consequence, the bicycle lighting system 10 is more versatile, and can be fitted into various sizes of bicycles.

Referring now to FIG. 3, there is shown a cross-sectional view taken along line 3—3 of FIG. 2. The cross-section of coiled electrical cord is shown as 61. A negative electrical wire 67 and a positive electric wire 65 emerge from the coiled cord 61 for making the necessary electrical connection. The battery pack end cap 34 surrounds and encompasses the threaded shaft length adjuster 22. Internal spline 59 in the battery pack end cap 34 slides into a groove 72 formed along the length of the threaded shaft length adjuster 22 and, thus, prevents the shaft 22 from rotating out of position with respect to the battery pack end cap 34. This, in effect, assures that the entire lighting system 10 does not rotate out of its proper position with respect to the bicycle frame 201.

Referring now to FIG. 4, it can be seen that the length of the lighting system 10 can be adjusted by rotating the internally threaded washer 24 along the length of the threaded shaft length adjuster 22. The internally threaded washer 24 can be moved along the helical grooves extending the entire length of the threaded shaft length adjuster 22 by simply rotating it either clockwise or counter-clockwise. The closer the washer 24 comes to the rearmount 18, the shorter the overall length of the lighting system 10 becomes. The forward portion of the threaded shaft length adjuster 22 slides into the cavity of the battery pack end cap 34 as the length of the lighting system 10 is shortened.

Still referring to FIG. 4, to mount the lighting system 10 along and beneath the top tube of the bicycle, it is necessary to adjust the internally threaded washer 24 by rotating it so that the entire system 10 will be about $\frac{1}{4}$" shorter than the space between the head tube 65 and the seat tube 62 of the bicycle to which the system is to be mounted. During length adjustment, the two cam levers 28 should be in their downward position, that is, the long dimension of the levers should extend perpendicular to the axis of the battery housing so that the compression-type spring 26 is also in its (uncompressed) state. The rearward surface of washer 17 abuts the forward end of spring 26. The forward portion of the threaded shaft length adjuster 22 slides into the battery pack end cap 34. For the purpose of length adjustment, the threaded shaft length adjuster 22 should slide into the battery pack end cap 34 to the extent that the vertical surface of the internally threaded washer 24 abuts the compression-type spring 26 which, in turn, abuts one radially extending surface of washer 17. The opposite surface of washer 17 abuts the battery pack end cap 34.

When the length of the lighting system 10 has been properly adjusted, the lighting system 10 is placed in its mounting position just under and substantially parallel to, the top tube of the bicycle. Then, both cam levers 28 are rotated 90° in a forward and upward direction so that the long dimension of levers 28 is parallel to the axis of the battery housing. Rotation of the cam levers 28 in this direction presses the flat surface 13 of the levers against the forward surface of washer 17. The rearward surface of washer 17 also compresses helical spring 26. Spring 26, in turn, presses against the forward vertical surface of the internally threaded washer 24. The washer 17 has an internal circular hole large enough to slide unhindered along the entire length of the threaded shaft length adjuster 22. Spring 26 must be made from a very stiff material, so that its effective length does not vary much as it is compressed. When the cam levers 28 are rotated 90° in a forward and upward direction (i.e., in a "locked" position in which the long dimension levers are parallel to the battery housing), the entire rearward assembly is moved toward the rear of the bicycle, thus extending the length of the light system 10.

A flat surface 13 on cam levers 28 protrudes about $\frac{1}{4}$". Rotating levers 28 in a forward and upward direction so that the long dimension of the levers is parallel to the axis of the battery holder should, therefore, extend the length of the entire lighting system 10 by about $\frac{1}{4}$". However, as mentioned above, the length of the entire system has been previously adjusted to be only $\frac{1}{4}$" shorter than the space between the head tube 65 and the seat tube 62 of the bicycle to which the system is to be mounted. Therefore, when the cam levers 28 are rotated in a forward and upward direction, the system's length increases by about $\frac{1}{4}$", compressing the spring 26 by about $\frac{1}{4}$" in length at the same time. That is, when spring 26 is compressed, it is about $\frac{1}{4}$" shorter than when it is in its relaxed uncompressed condition. In this way spring 26 presses the forward and rearward halves of the system away from one another. This force holds the entire lighting system 10 in place in between the head tube 65 and the seat tube 62 of the bicycle to which the system is mounted. The force also pushes washer 17 against flat surface 13 of levers 28 to insure that the levers do not rotate back to their downward (unlocked) position. Spring 26 also has another function, in that is allows "misadjustment" of overall length when the internally threaded washer 24 is initially positioned. For example, if the internally threaded washer 24 has been positioned so that the length of the assembly of the lighting system 10 is about ¼" or ½" shorter than the space between the head tube and the seat tube of the bicycle, instead of the preferred ⅜" distance as mentioned above, spring 26 will allow for this misadjustment by compressing its length less or more as required when the cam levers 28 are rotated 90° in a forward and upward position to lock the system in place.

The internal parts of the battery pack 38, the internal contact plug 27 in the battery pack, the interior of the battery pack end cap 34, and the threaded shaft length adjustor 22 are each provided with either a longitudinally extending groove or a mating spline to engage one another to prevent any rotation of the internal components of the lighting system 10. Thus, when the lighting system is assembled, all these components are positioned in their correct rotational orientation with respect to each other. That is, the headlamp 52 and the tail lamp 12 protrude off to the left side of the bicycle and in a direction parallel to the ground. In this configuration, spline 25 of the internal contact plug 27 is received into groove 60; spline 23 of the battery pack mid cap 29 is also received into groove 60 of the battery pack 38; and the internal spline 59 of the battery pack end cap 34 is received into groove 72 of the threaded shaft length adjuster 22.

The coiled electrical cord 61 is connected to both the positive electrical contact post 19 and the negative contact 2 in order to complete the power circuit to the tail lamp 12. The coils in the cord 61 accommodate changes in overall length of the lighting system 10. FIG. 4 illustrates the use of five batteries 37 in series inside the battery housing or battery pack 38. Normally, five D-cell batteries are used, each with 1.25 volts, although other configurations are possible. The battery pack 38 is provided with three screw holes 36 which receive threaded screws 35 to secure the internal contact plug 27 in place within the battery pack by means of holes 33 formed in the internal contact plug 27 in alignment with holes 36 of the battery pack 38. The internal contact plug 27 includes a contact spring 31, for electrical engagement with the negative pole of the batteries.

Still referring to FIG. 4, the front end of the outer housing of the lighting system 10 includes a recessed hole 134 for engaging the tire pump peg on the rear of the head tube of a bicycle. Also at the forward end of the housing is a headlamp conduit 42 which is preferably hollow and includes an externally threaded shaft that passes through a transversely extending aperture in the rear of the headlamp assembly 52. A quick-release lever 48 for headlamp 52 is internally threaded and is received onto the threaded shaft at the end of the conduit 42. When the lever 48 is rotated in a clockwise direction, the lever presses against the bore of the headlamp assembly to lock it into position against the end of the conduit 42. When the lever 48 is rotated in a counter-clockwise direction, as shown by arrow 102, it no longer presses the headlamp assembly against the end of conduit 42, so the headlamp 52 can rotate freely about the threaded shaft upon which it is mounted in either an upward or a downward direction as shown by arrows 104 to adjust the angle of the headlight beam. When the desired angular position of the headlamp assembly has been attained, lever 48 is turned clockwise to again lock the headlamp 52 against further movement.

For purposes of storage, the elongate housing can be separated into two pieces at the junction of battery pack 38 and battery pack end cap 34. When assembled, the electrical contact 21 is retained inside the internal electrical contact plug 27 by a clip (not shown). For separation, simply pull the battery pack end cap 34 rearward. Further, the tail lamp holder 16 can be folded back 180° to reduce the length of the stored piece.

The height of the tail lamp assembly is adjustable by a mechanism that is similar to the one described above for adjusting the angle of headlamp 52. This allows the height of the tail lamp to be adjusted in order to clear any packs or racks that may be attached to the bicycle or the seat. When the quick-release lever 15 is rotated in the direction as shown by arrows 98, the conduit 16 can be rotated in the direction as shown by arrows 96. Similarly, the quick-release lever 14 is rotated clockwise to lock the tail lamp 12 into position. When the quick-release lever 14 is rotated in a counter-clockwise direction as shown by arrows 92, the tail lamp 12 can be rotated in a direction as shown by arrows 94.

Referring now to FIG. 5, there is shown a longitudinal cross-sectional view taken along line 5—5 of FIG. 2. Here it is shown that the lighting system 10 is controlled by toggle 45 of the on/off switch 132. The auxiliary tire pump peg 44 is shown to be situated on the underside of the battery housing near the front portion of the lighting system 10. The positive contact post 19, together with its negative electrical contact 21, is connected to the coiled cord 61 through a connecter 124. At the rear of lighting system 10 the tail lamp holder 16 receives the coiled cord 61 therein. Wiring continues through conduit 16 to the tail lamp (not shown). When the system is mounted on a bicycle frame, the upper V-block 114 and the lower rearward V-block 116 engage the lower side of the top tube 68 and forward side of the seat tube 62 of the bicycle, respectively, as illustrated in FIG. 2. The two V-blocks, 114 and 116, prevent the lighting system 10 from rotating and also center the system under the top tube 68 and against the seat tube 62.

Referring to FIG. 5, there is shown a schematic circuit of the lighting system 10. None of the wires are exposed to the outside but, rather, are contained within the housing unit itself for protection. Schematic line 140 represents the connection of a lead from the negative pole of the rearmost battery 37 to the recharger receptacle 47 (not shown). Contact plate 142 includes two contacts, the first of which is connected to wire 143 that extends directly to the battery recharger receptacle 47 (not shown) so that the lighting system 10 can be recharged regardless of the position of the on/off switch 132; the second contact of plate 142 is connected to wire 146 that is, in turn, connected to the on/off switch 132 to interrupt current to both the headlamp 52 and the tail lamp 12 when the switch is turned to its "off" position. The headlamp 52 is connected to a positive lead 144, and to the negative pole of the last battery through schematic line 138. The tail lamp 12 is connected to a positive lead represented by schematic line 136 and joins lead 144. The tail lamp 12 is also connected to the negative pole of the rearmost battery through coiled cord 61, connector 124, electrical contact 21, and spring 31.

The lighting system 10 is preferably constructed from lightweight but sturdy plastic or metal alloy. Both the tail lamp conduit 16 and the headlamp conduit 42 can be constructed from acrylonitrile-butadiene-styrene terpolymers (ABS) plastic or aluminum alloy. The casing of battery pack 38 and the threaded shaft length adjuster 22 are preferably made from ABS plastic. Because of the strength requirements, washer 17, quick release levers 14, 15 and 48 and cam levers 28 are preferably constructed from light metal or alloy, such as aluminum or aluminum alloy. Springs 26 and 31 are constructed from steel. Model U70H headlamp from Germany, available in this country from the Union Frondenberg U.S.A. Co. in Olney, Ill., has been used satisfactorily for headlamp 52. Likewise, a Model S70 lamp from the same source is also satisfactory for tail lamp 12.

Referring now to FIG. 6, there is again shown a conventional bicycle 200 having an adjustable-length removably-mountable holder system 300 mounted below and parallel to top tube 68 of bicycle frame 201. The adjustable-length, removably-mountable holder system 300 is situated between seat tube 62 and head tube 65 and, in this embodiment, is secured to the top tube 68 using T-slot clamp 54. For a bicycle equipped with a tire pump peg, as illustrated previously in FIG. 1A, the T-slot clamp 54 is not needed to secure the adjustable-length, removably-mountable holder system 300 onto the bicycle. Further illustrated in FIG. 6 is an externally wired front headlight assembly 352 and an externally wired taillight assembly 312. Headlight power cord 311 and taillight power cord 313 electrically connect the adjustable-length removably-mountable holder system 300 to the headlight and taillight assemblies, respectively.

As illustrated by FIG. 6, the adjustable-length, removably-mountable holder system 300 includes an elongate tubular assembly formed of rear mount 318. Holder end cap 334 inserts into holder 338 and is positioned between rear mount 318 and holder 338. A spring biased adjustable spring clamp means 326 affixes holder end cap 334 to rear mount 318. The spring clamp means recesses to secure the tubular holder assembly below and in parallel fashion with top tube 68 of the bicycle 200. The spring clamp means provides the force needed to wedgingly secure the holder tube between the head tube 65 and the seat tube 62. This spring which provides the wedged securement, contributes to the easy mounting and removal of the holder system as well as furnishing the means for numerous alternative mounting positions.

Figure 7:
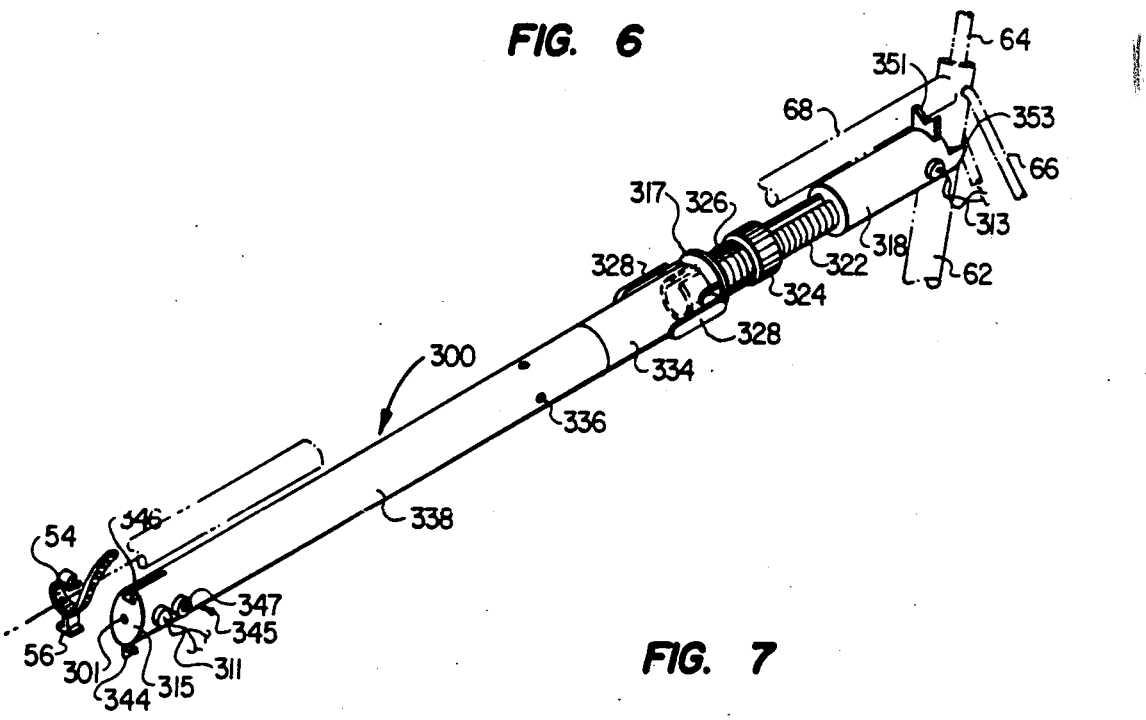
FIG. 7 is a perspective view of one embodiment of an adjustable-length removably-mountable holder system constructed in accordance with the principles of the present invention.

Referring now to FIG. 7, there is shown a perspective view of one embodiment of a removably-mountable holder system 300 constructed in accordance with the principles of the present invention along with fragmentary portions of the horizontal top tube 68 of a bicycle. The front portion of holder 338 shows frontal surface 315. At the center of frontal surface 315 is recess 301, which is adapted to engage a bicycle frame tire pump peg In this particular embodiment, an auxiliary tire pump peg 344 is fitted along the underside of the holder 338. The frontal upper surface of holder 338 also contains the female portion 346 for T-slot clamp 54. The male T-slot portion 56 of the T-slot clamp 54 slides into the female portion 346 of the T-slot mounting device. Clamp 54 mounts to the top tube 68 of the bicycle frame, thereby affixing the front end of the holder system 300 to the bicycle. The frontal surface 315, in this embodiment does not make contact with the head tube 65 of the bicycle. Instead, male T-slot portion 56 engages the rearmost portion of the female T-slot 346 to furnish a secure frontal mounting. An alternative embodiment, however, may show the frontal surface 315 engaging the head tube 65 so that the male portion 56 does not engage the rearmost portion of the female T-slot 346 and thereby provides only vertical support and no horizontal support. Also illustrated in this embodiment at the front section of holder 338 is the interface of headlight power cord 311. In this embodiment the power cord 311 emerges from the holder body, alternative embodiments may employ male and female connectors so that disconnection of the headlight does not leave any dangling wires. Adjacent to power cord 311 is the battery charger receptacle 347. The batteries mounted within the battery chamber, can be recharged by means of household current (via a transformer) connected to the system through this receptacle 347. Also located at the front end of the holder 338, on the underside portion is on and off toggle switch 345, which is connected to enable manual electrical actuation of the independently mounted headlight 352 and taillight 312 (not shown).

Still referring to FIG. 7, the middle assembly of the holder system 300 includes a holder housing 338 for receiving a plurality of longitudinally oriented objects, such as a series of abutting connected direct current batteries, a rolled up map, house keys or money. At the rear of the middle assembly are a washer 317 and two cam levers 328. In use, one terminal of each cam lever 328 engages the surface of the washer 317. In addition to being the means of applying the force for wedged securement of the assembly, spring 326 allows for misadjustment of the length of the elongate holder system 300. Directly rearward from the holder 338 is the holder end cap 334.

Posterior of washer 317 is positioned the rear mount assembly 318. The rear mount 318 is comprised of a compression-type spring 326 followed by an internally threaded washer 324. Internally threaded washer 324 screws onto threaded shaft length adjuster 322 and can be screwed in and out along the horizontal axis of the holder system 300. The rear mount 318 is firmly affixed to the threaded shaft 322. Taillight power cord 313 emerges from the end portion of the rear mount 318. An alternative embodiment may show the taillight power cord plugging into a receptacle on the end portion FIG. 7 also shows that the rear mount 318 is positioned abuttedly against the front surface of the seat tube via a lower V-block 353. The upper V-block 351, in turn abuttedly engages the rear underside of top tube 68 of the bicycle frame.

Figure 8:
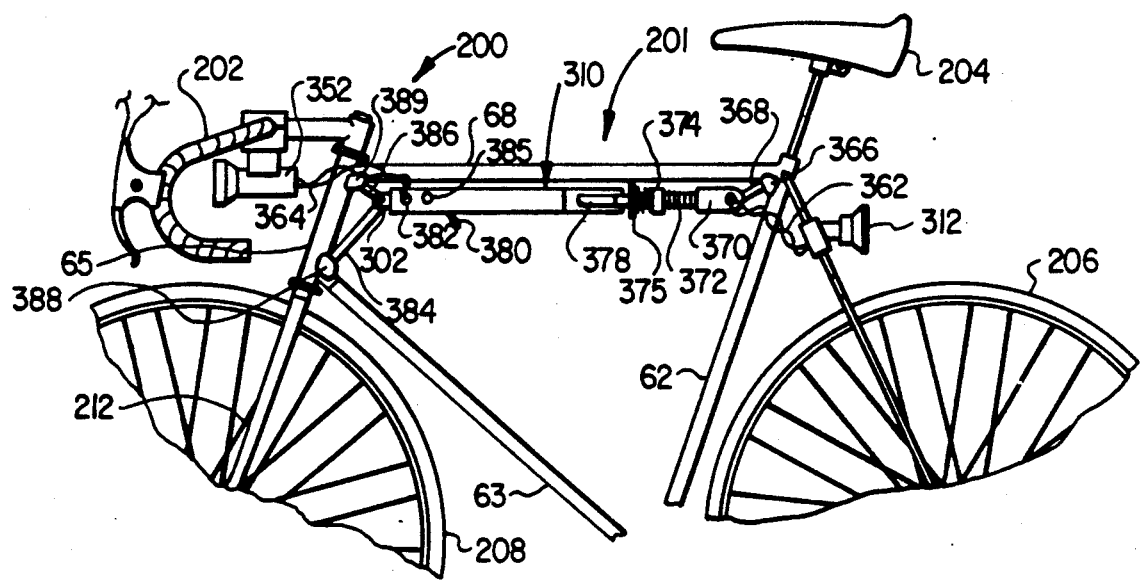
FIG. 8 is a partial side view of a bicycle having an adjustable-length, removably-mountable holder system illustrating an alternative method of mounting and also being adapted for use with front and rear lights.

Referring now to FIG. 8, there is shown a partial side view of a bicycle having an adjustable-length removably-mountable holder system 310 alternatively mounted below, and parallel with, top tube 68. In this embodiment dual forward extension arms 384 and 386, combine with the rear mount extension arm 368 to wedge the holder between seat tube 62 and head tube 65. Forward circular V-blocks 388 and 389 extend from forward extension arms 384 and 386, respectively. V-block 389 engages the bicycle frame at the junction of head tube 65 and top tube 68, while V-block 388 engages the bicycle frame at the junction of head tube 65 and down tube 63. The extension arms 384 and 386 are, themselves, of adjustable length so that they can be adjusted to fit exactly, even though various bicycles have various head-tube lengths; and the angles between the head tube and top tube and between the head tube and down tube vary on different bicycles. Forward extension arms 384 and 386 meet at anchor point 302 located at the front of holder 310. The merger of the extension arms at anchor point 302 creates the apex of a "V" shape. Anchor point 302 permits arcuate adjustment of the extension arms. If they are pulled closer to one another, i.e., the angle between them is smaller., this creates a "thinner" "V." If they are pulled farther apart, this creates a "fatter" "V". The distance between circular V-blocks 388 and 389 changes depending upon the length of the head tube 65, and also on its angle from vertical, which is different on various bicycles.

Still referring to FIG. 8, headlight 352 is independently mounted on handlebars 202. Headlight power cord 364 emerges from power socket 382 at the forward section of receptacle 365 and carries power to the headlight 352. Adjacent to the power cord interface on the body of the receptacle 365 is recharger receptacle 385. Toggle switch 380 resides on the underside surface of the receptacle 365 and is used to switch the headlight and taillight on and off when the lights are connected to the system.

Mounting is performed through the operation of two cam levers 378 located at the rear section of the holder body 338. Immediately behind cam levers 378 is washer 375 and compression spring 376 which engages internally threaded washer 374. The length of the holder system can be adjusted through rotation of internally threaded washer 374 along the length of threaded shaft length adjuster 372. The closer the washer 374 comes to the rearmount 370, the shorter the overall length of the holder system 310 becomes. During length adjustment, the cam levers 378 are placed in their relaxed position e.g., pointing downward so that they are perpendicular with the axis of holder 338. This relaxed position allows the springs to expand, thereby easing the tension and the forces they exert. Rear mount 370 adjoins threaded shaft length adjustor 372 at its forward end and rear mount extension arm 368 extends from the rear end. Contact with the bicycle frame is made at the junction of top tube 68 and seat tube 62 by circular V-block 366, affixed to the end of rear mount extension arm 368. Taillight power cord 362 emerges from the rear mount 370 and runs to independently mounted taillight assembly 312.

Figure 9:
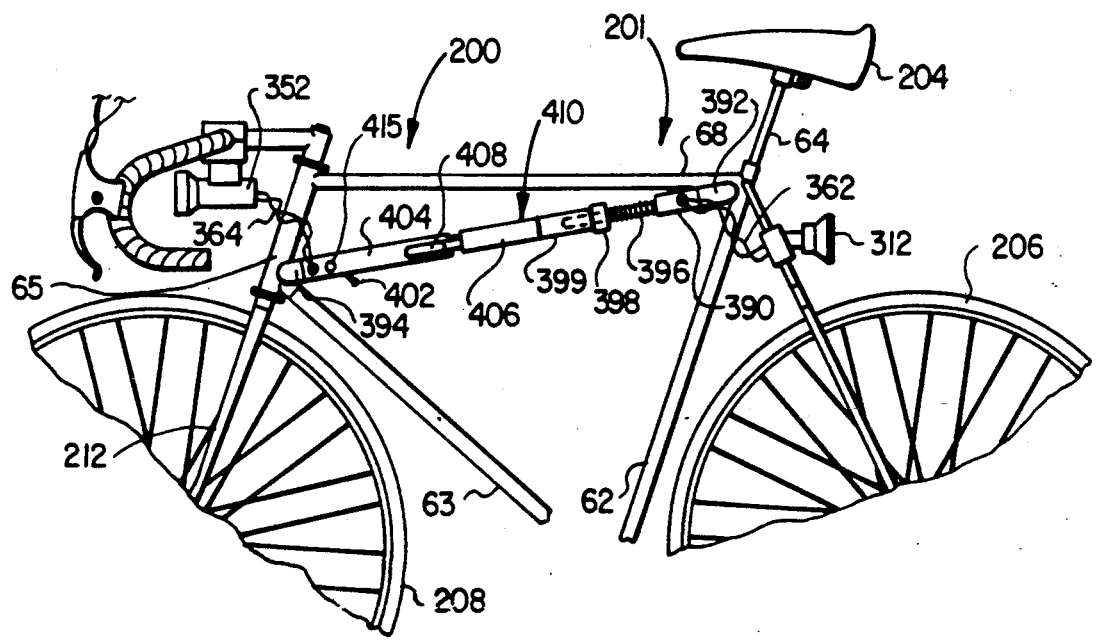
FIG. 9 is a partial side view of a bicycle having an adjustable-length, removably-mountable holder system illustrating an alternative method of mounting under the horizontal top tube and also adapted for use with front and rear lights.

Referring now to FIG. 9, there is shown a partial side view of a bicycle with an adjustable-length removably-mountable holder system 410 mounted below top tube 68 but in a forwardly descending fashion such that the front section of the holder system engages the junction of head tube 65 and down tube 63 and the rear section engages the bicycle frame at the junction of top tube 65 and seat tube 62. In this embodiment V-block 394 is affixed directly to the holder body 404. V-block 394 adheres to the front face of holder body 404 and makes direct contact with the bicycle frame. Headlight power cord 364 runs from the front portion of the holder to the independently mounted headlight 352. Adjacent to the power cord connection to the holder 410 is the recharger receptacle 415. On/off toggle switch 402 located on the front, underside of holder body 404 operates the headlight 352 and taillight 312.

Still referring to FIG. 9, cam levers 408 push against a spring (not shown) proximate to the rear holder body 406. Holder end cap 399 abuts the rear holder body 406 and engages threaded shaft length adjuster 396 and internally-threaded washer 398. The threaded shaft length adjuster 396 is attached to the rear mount 390. Rotation of the internally-threaded washer 398 along the length adjuster 396 permits gross length variation of the holder system. Engagement of the spring (not shown) through operation of the cam levers 408 increases the force expended by the spring for precise length adjustment and attachment force required to firmly secure the holder system to the bicycle. When engaged, the spring forces rear V-block extension 392, located on the rear face of rear mount 390, into the junction of top tube 68 and seat tube 62. Taillight power cord 362 emerges from the rear mount 390 and connects to taillight 312.

Figure 10:
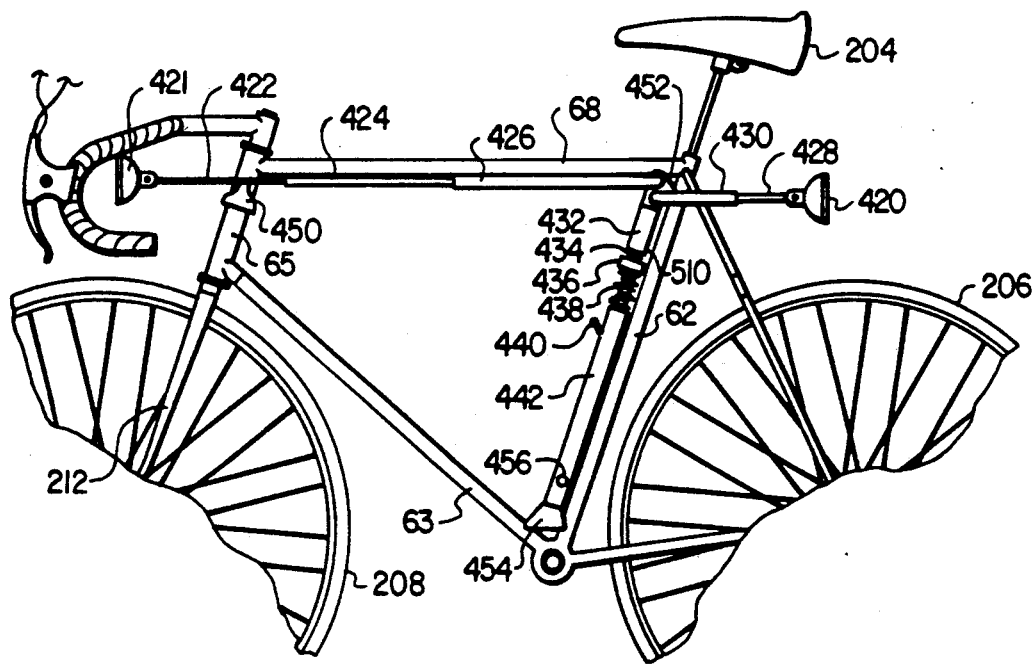
FIG. 10 is a partial side view of a bicycle having an adjustable-length removably-mountable holder system mounted along and parallel with the seat tube, also illustrating an alternative method of light attachment.

Referring now to FIG. 10, there is shown a partial side view of a bicycle wherein a removably-mountable holder system 510 is affixed in an alternative manner. In this embodiment the holder system 510 is mounted in substantially vertical position, parallel with seat tube 62. Also shown in this embodiment are headlight conduits 422, 424, and 426 as well as taillight conduits 428 and 430 affixed to the upper end of the holder body. The headlight and taillight conduits enclose the wiring necessary for the operation of the headlight 421 and taillight 420. Headlight conduit 426 and taillight conduit 430 are rotatably attached to the upper portion of the top mount 432 of the holder body 442. The rotational attachment allows the user to retract the lights and remove them from use. It also makes it easier to collapse the unit for storage purposes. The headlight conduit sections 422, 424, 426, and sections 428 and 430 are constructed in a telescoping manner so that length adjustment is not done by rotating the entire conduit. It is done in the same way One adjusts the legs on a photographer's tripod. The headlight 421 and taillight 420 can be placed in their ideal position with respect to various operational parts of the bicycle, and also with respect to the rider's body. Headlight support clamp 450, which includes a Velcro strap that around the head tube 65, supports the headlight conduit 422 in order to rigidly affix the lighting system to the bicyle frame and keep headlight 421 focused on the roadway ahead of the bicycle. Taillight conduits 428, 430 and the taillight 420 may similarly be retracted from use.

The rotational attachment allows for adjustment of said conduits with respect to the main body of the holder system. This is necessary because on different bicycles, both the seat tube and top tube can have substantially different angles (from vertical and horizontal, respectively) from those shown in FIG. 10.

Still referring to FIG. 10, the holder is mounted so that it is wedged between the junction of the top tube 68 and the seat tube 62 and the junction of the seat tube 62 and down tube 63. Triangular V-block 452, located on the end of top mount 432, wedgingly engages the bicycle frame at the junction of the seat tube 62 and the top tube 68. Top mount 432 receives threaded shaft length adjustor 434. Rotating threaded shaft length adjustor 434 into top mount 432 permits gross adjustment of the holder's overall length. Internally threaded washer 436 forcefully rests against threaded shaft length adjustor 434 as a result of pressure transmitted from compression-type spring 438, which also engages the holder body 442. Triangular V-block 454, located on the lower end of the holder body 442, wedgingly engages the bicycle frame at the junction of seat tube 62 and down tube 63. Also placed on the lower end of the holder body 442 is battery recharge receptacle 456. On/off toggle switch 440 extends from the holder body 442 to allow operation of the headlight 421 and taillight 420.

Figure 11:
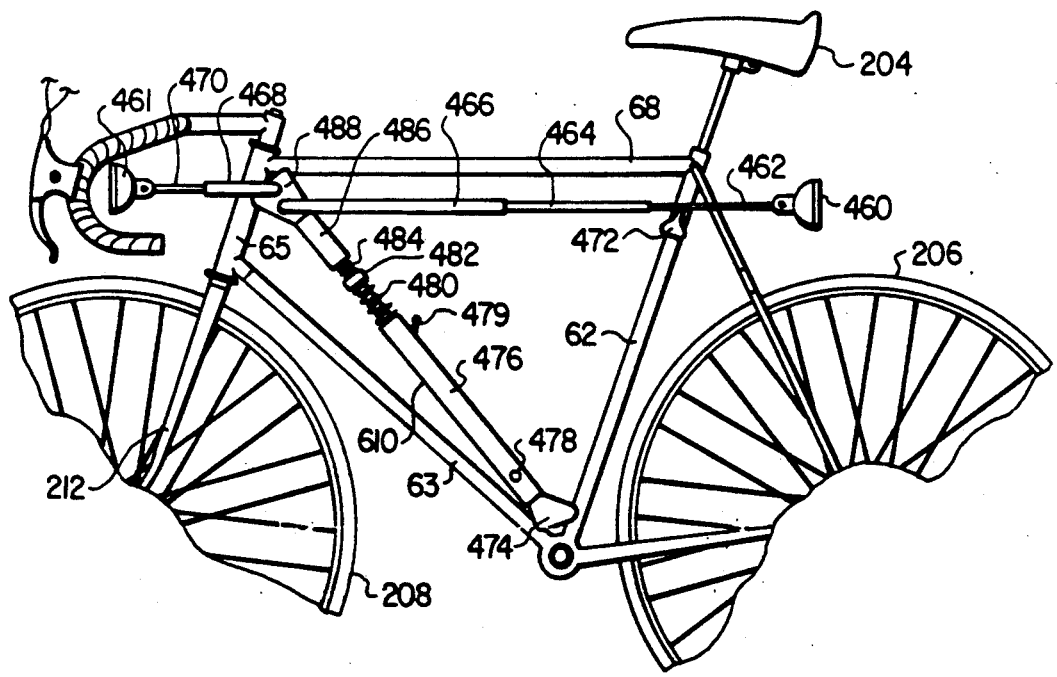
FIG. 11 is a partial side view of a bicycle having an adjustable-length removably-mountable holder system mounted along and above the down tube and illustrating an alternative method of light attachment.

Referring to FIG. 11, there is shown a partial side view of a bicycle wherein a removably-mountable holder system 610 similar to the embodiment shown in FIG. 10 is mounted to the bicycle in yet another way. In this embodiment the holder system 610 is mounted at approximately a forty-five (45) degree angle between the junction of seat tube 62 and down tube 63 and the junction of head tube 65 and top tube 68. Also shown in this embodiment are headlight conduits 468, and 470 as well as taillight conduits 466, 464, and 462, both conduit systems being rotatably affixed to the upper end of the holder system 610. The headlight and taillight conduits enclose the wiring necessary for the operation of the headlight 461 and taillight 460. The rotational attachment allows the user to retract the lights and remove them from use. The headlight conduit sections 468 and 470, and sections 462, 464 and 466 are constructed in a telescoping manner so that length adjustment is not done by rotating the entire conduit. It is done in the same way one adjusts the legs on a photographer's tripod. The headlight 461 and taillight 460 can be placed in their ideal position with respect to various operational parts of the bicycle, and also with respect to the rider's body. Taillight support clamp 472, which includes a Velcro strap that wraps around the seat tube 62, supports the taillight conduit 462 in order to rigidly affix the lighting system to the bicycle frame and keep taillight 460 focused on the roadway. Headlight conduits 468, 470 and headlight 461 may similarly be retracted from use.

Still referring to FIG. 11, the holder is mounted so that it is wedged between the junction of the top tube 68 and the head tube 65 and the junction of the seat tube 62 and the down tube 63. Triangular V-block 488, located on the end of top mount 486, wedgingly engages the bicycle frame at the junction of the head tube 65 and the top tube 68. Top mount 486 receives threaded shaft length adjustor 484. Rotating threaded shaft length adjustor 484 into top mount 486 permits gross adjustment of the holder's overall length. Internally threaded washer 482 forcefully rests against threaded shaft length adjustor 484 as a result of pressure transmitted from compression-type spring 480, which also engages the holder body 476. Triangular V-block 474, located on the lower end of the holder body 476, wedgingly engages the bicycle frame at the junction of seat tube 62 and down tube 63. Also placed on the lower end of the holder body 476 is battery recharge receptacle 478. On/off toggle switch 479 extends from the holder body 476 to allow operation of the headlight 461 and taillight 460.

Figure 12:
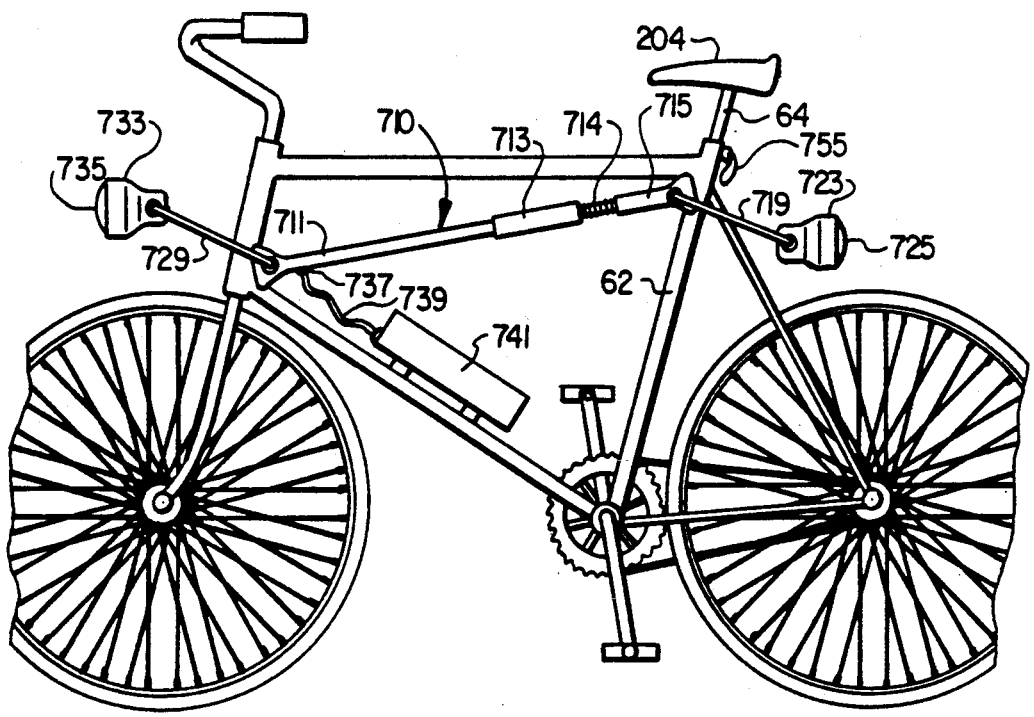
FIG. 12 is a side plan view of a bicycle having mounted to its frames one embodiment of an adjustable-length removably-mountable holder system constructed in accordance with the principles of the present invention.

Referring now to FIG 12, there is shown a side plan view of a bicycle having mounted diagonally between its seat tube 62 and its head tube 65 one embodiment of an adjustable-length removably-mountable holder system 710 constructed in accordance with the principles of the present invention. The adjustable-length removably-mountable holder system 710 is mounted below top tube 68 but in a forwardly descending fashion such that the front section of the holder system engages the junction of head tube 65 and down tube 63 and the rear section engages the bicycle frame at the junction of the top tube 65 and the seat tube 62. In this embodiment, a triangular V-block 720 is affixed directly to the front tube 711 and wedgingly engages the bicycle frame at the junction of the head tube 65 and the down tube 63. Another triangular V-block 730, located at the end of the rear tube 715, wedgingly engages the bicycle frame at the junction of the seat tube 62 and the top tube 68. An integral threaded portion 714 of the rear tube 715 functions as a length adjuster. A disconnectable power cord 739 connects a separate power supply 741 to the front tube 711 via a power cord receptacle 737. In this embodiment, the power supply 741 is mounted on the down tube 63. Generally, although not necessarily so, the power supply 741 is removably mounted on the down tube 63. A headlight conduit 729 connects the head lamp 733 to the front tube 711. To the front of the head lamp 733 is a protective headlight lens 735. Taillight conduit 719 connects the rear tube to a taillight 723, which also is fitted with a protective taillight lens, generally a red colored lens. The headlight and taillight conduits enclose the wiring necessary for the operation of the headlight 733 and the taillight 723. Each of the headlight and taillight conduit and each of the headlight and the taillight is rotatably and articulatingly attached to the system 710. By having a power supply 741 separate from the system 710, a major portion of the weight of the system is removed from the system. Thus, the lighter lighting system is much less prone to be dislodged when the bicycle is jarred, such as riding off-road, or when hitting a pot-hole or curb. The cost for manufacture would likewise be decreased because there is no need for example, to build in a cam device. Both the front tube 711 and the rear tube 715 have their own respective integral triangular V-blocks, no system of splines is needed since rotational alignment of the front tube 711, the rear tube 715, and even the center tube 713 is unnecessary. The two triangular V-blocks, by virtue of being wedged against the bicycle frame by the force of the compression spring, ensure that the two conduits 729 and 719, and therefore the headlamp 733 and tail lamp 723, retain their proper rotational alignment with respect to the bicycle frame. Referring now to FIG. 13, there is shown a perspective view of the adjustable-length removably-mountable holder system 710 of FIG. 12 showing a partial cross-sectional view. An internal wiring hardness 751, as shown by phantom line, runs from power cord receptacle 739 (not shown) to both headlamp bulb 749 and tail lamp bulb (not shown). The headlamp 733 is shown to be fitted with a parabolic reflector 745. Wing nuts (727, 731) fasten the headlight conduit 729 to the front tube 711 and headlight 733, respectively. Similarly, wing nuts 717 and 727 are used to fasten taillight conduit 719 to the rear tube 715 and the taillight 723, respectively. The front tube 711 slidingly engages the center tube 713 and is fitted with a compression spring 743, which when compressed will exert an "expanding" pressure. The integral threaded section 714 of the rear tube 715 allows the extension and retraction of the rear tube 715 from the center tube 713. Gross length adjustment is done by rotating the threaded section 714 of the rear tube 715 together with the triangular V-block 730 with respect to the center tube 713. As the rear tube 715, together with the triangular V-block 730, inserts further into the center tube 713, the overall length of the system 710 is shortened. Since the compression spring 743 can accommodate some variability in its length after it is being compressed it allows for some misadjustment of the gross length adjustment described above. Thus, by use of the compression spring 743 and the threaded section 714, the length of the system 710 can be adjusted according to need. Preferably, the two V-blocks 720 and 730 are symmetrical and similar. Thus, the system 710 can be installed on the bicycle in various different arrangements. For example, both conduits 729 and 719 can be arranged to be on the right-hand side of the rider or on the left-hand side of the rider. Alternatively, one conduit can be arranged to be on one side of the rider while the other conduit can be arranged to be on the opposite side of the rider. This flexibility of arrangement allows the system 710 to be able to be installed on different types of bicycles without interfering with the normal function of the bicycles.

Figure 14:
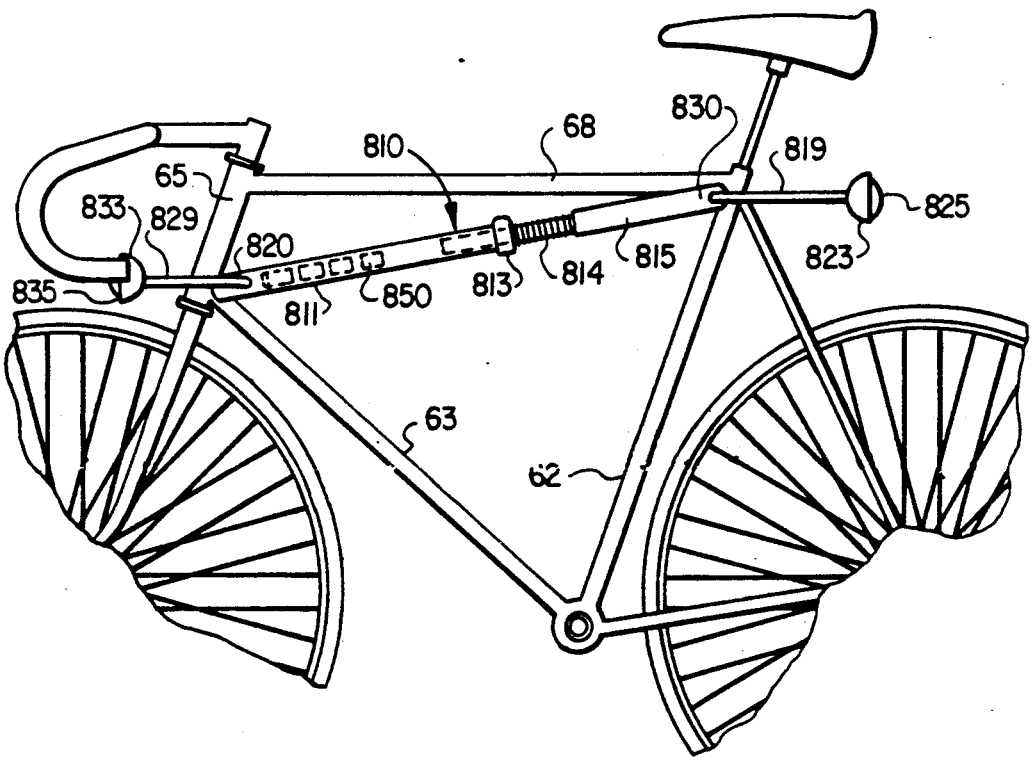
FIG. 14 is a side plan view of a bicycle having mounted to its frame one embodiment of an adjustable-length, removably-mountable bicycle lighting system illustrating an alternative mounting system.

Referring now to FIG. 14, there is shown a side plan view of a bicycle having mounted to its frame yet another embodiment of an adjustable-length, removably-mountable bicycle lighting system. The lighting system 810 is mounted diagonally between a seat tube 62 and a head tube 65. The lighting system 810 is mounted in a forwardly descending fashion below the top tube 68 such that the front section of the lighting system engages the junction of the head tube 65 and the down tube 63, while the rear section of the lighting system 810 engages the bicycle frame at the junction of the top tube 68 and the seat tube 62. In this embodiment, a rearward triangular V-block 830 and a forward triangular V-block 820 are integrally formed with the rear tube 815 and the front tube 811, respectively. The forward triangular V-block 820 engages the intersection of the down tube 63 and the head tube 65. A headlight conduit 829 emerges from the front tube 811 and extends to a headlight 833. To the front of the headlight 833 is a protective headlight lens 835. A taillight conduit 813 connects the rear tube 815 to the tail light 823, which is also fitted with a protective tail light lens 825. In this embodiment, the rear triangular V-block 830 is wedgedly engaged with the intersection of the top tube 68 and the seat tube 62. Both the headlight conduit 829 and the tail light conduit 819, as well as the headlight 833 and the tail light 823, are rotatably and articulatingly attached to the system 810. Batteries 850 provide power for the system 810. Wiring internal to the front tube 811, the center tube 813 and the rear tube 815 deliver the current necessary to operate the headlight 833 and the tail light 823.

The proper length of the lighting system 810 is regulated by use of an externally threaded section 814 which is an integral part of the rear tube 815. The threaded section 814 can freely slide in and out of a cavity at the rear of the front tube 811. An internally threaded collar 813 is provided on the end of externally threaded section 814. This collar 813 can butt up against the rear of the front tube 811. This collar 813 can be rotated clockwise or counter-clockwise to move forward or rearward along the threaded section 814. Thus, moving the collar 813 formed along threaded section 814 will lengthen the lighting system 810, while moving the collar 813 rearward will shorten the lighting system 810. To mount the lighting system 810 onto a bicycle, the collar 813 is rotated toward the rear so the lighting system 810 is short enough to fit "inside" the frames of the bicycle. The collar 813 is then rotated in an opposite direction to move it forward along threaded section 814 so that the system 810 is lengthened. The collar 813 is rotated further forward so that the system 810 elongates and wedges into the bicycle frame. Of course, additional mechanism can be added to prevent collar 813 from rotating backward and thereby unwedging system 810 from the bicycle frame. In this embodiment, the rotatable feature provided by the integral threaded section 814 and the collar 813 deliver sufficient force to properly wedge lighting system 810 within the bicycle frame.

Referring now to FIG. 15, there is shown a side plan view of a bicycle having mounted diagonally between its seat tube 62 and head tube 65 one embodiment of an adjustable-length removably-mountable compartment system 910 constructed in accordance with the principals of the present invention. The adjustable-length removably-mountable compartment system 910 is mounted below the top tube 68 but in a forwardly descending fashion such that the front section of the compartment system engages the junction of the head tube 65 and the down tube 63, and the rear section engages the bicycle frame at the junction of the top tube 65 and the seat tube 62. In this embodiment, a forward triangular V-block 920 is affixed directly to a front tube 911 and wedgingly engages the bicycle frame at the junction Of head tube 65 and down tube 63. A second rear triangular V-block 930, located at the end of a rear tube 915, wedgingly engages the bicycle frame at the junction of the seat tube 62 and the top tube 68. An integral threaded section 914 of rear tube 915 functions as a length adjuster. As explained both the front tube 911 and the rear tube 915 have their own respective integral triangular V-blocks, and no system of splines is needed since rotational alignment of the front tube 911 and the rear tube 915 and even the center tube 913 is unnecessary. The two triangular V-blocks by virtue of being wedged against the bicycle frame insures that the system remains secured to the bicycle frame.

Still referring to FIG. 15, there is shown a compartment 950 integrally formed between the front tube 911 and the forward triangular V-block 920. Hinges 952 secure compartment access door 956 to compartment 950 and allow compartment access door 956 to be swingingly opened and closed. Knob 954 is provided for the user to grasp when opening and closing access door 956.

It is thus believed that the operation and construction of the present invention will be apparent from the foregoing description. While the method and device shown and described have been characterized as being preferred, it will be obvious that various changes and modifications may be made therein without departing from the spirit and scope of the invention as defined in the following claims.

I claim:

1. An adjustable-length removably-mountable holder system for a bicycle comprising:
    an elongate hollow assembly for receiving an object, said elongate hollow assembly having a forward portion and a rearward portion;
    an ancillary lighting member in communication with said elongate hollow assembly;
    means for removably securing said elongate hollow assembly to a structural frame unit of said bicycle, said removably securing means being characterized as comprising an anterior and a posterior engaging block for wedgedly securing said holder system to said structural frame unit of said bicycle; and
    said adjustable-length removably-mountable holder system being characterized as having the length adjustable longitudinally in the direction of said elongate hollow assembly.

2. The holder system of claim 1 wherein said elongate hollow assembly comprises means for opening said hollow assembly so as to permit the insertion of said object.

3. The holder system of claim 1 wherein said elongate hollow assembly comprises power supply electrical connections mounted inside said elongate hollow assembly for receiving at least one battery.

4. The holder system of claim 3 wherein said elongate hollow assembly further comprises an electrical socket for coupling with said ancillary lighting member.

5. The holder system of claim 4 wherein said electrical socket interconnects with said power supply electrical connections.

6. The holder system of claim 1 wherein the elongate hollow assembly further comprises a manually actuatable switch means.

7. The holder system of claim 6 wherein said manually actuable switch interconnects with said power supply electrical connections.

8. The holder system of claim 1 wherein said elongate hollow assembly comprises at least one length adjuster and a spring means for mounting said holder system between structural frame units of a bicycle.

9. The holder system of claim 1 wherein said forward portion of said elongate hollow assembly further comprises a bicycle tire pump peg extending transversely therefrom.

10. An adjustable-length removably-mountable holder system for a bicycle to be mounted on a tubular frame unit of said bicycle in an area defined by a head tube, a down tube, a seat tube, and a top tube of said bicycle, said system comprising:
   an elongate hollow assembly for receiving an object, the length of said elongate hollow assembly being adjustable longitudinally in the direction of said elongate hollow assembly;
   an ancillary lighting member in communication with said elongate hollow assembly; and
   means for removably securing said elongate hollow assembly within said defined area.

11. An adjustable-length removably-mountable holder system for a bicycle having frame units, said system comprising:
   an elongate hollow assembly adapted for receiving a battery;
   a connector to electrically connect said elongate hollow assembly to an ancillary lighting system; and
   means for removably securing said elongate hollow assembly to the bicycle frame units by axially adjusting the length of said hollow assembly so as to wedge said hollow assembly between said bicycle frame units.

12. The holder system of claim 11 wherein said ancillary lighting system comprises a forward lighting assembly and a rearward lighting assembly.

13. The holder system of claim 12 wherein said forward lighting assembly comprises a headlamp independently mounted to the forward end of said bicycle.

14. The holder system of claim 13 wherein said headlamp is in communication With said elongate hollow assembly by way of an electrical wiring.

15. The holder system of claim 12 wherein said rearward lighting assembly comprises a tail lamp independently mounted to the rear end of said bicycle.

16. The holder system of claim 15 wherein said tail lamp is in communication with said elongate hollow assembly by way of an electrical wiring.

17. The holder system of claim 11 wherein said ancillary lighting assembly is actuated by a switch.

18. The holder system of claim 11 wherein said ancillary lighting system comprises a forward lighting assembly.

19. The holder system of claim 11 wherein said ancillary lighting system comprises a rearward lighting assembly.

20. An adjustable-length removably-mountable holder system comprising:
   an elongate hollow assembly comprising:
      a length adjustor;
      an axially extending attachment means having an anterior and a posterior engaging block extending therefrom to provide wedged securement of said elongate hollow assembly to a structural frame unit;
      said attachment means comprising a compression type spring; and
   means for connecting said elongate hollow assembly with an ancillary lighting member.

21. An adjustable-length removably-mountable holder system of claim 20 further comprising a lever for actuating and locking said compression type spring.

22. An adjustable-length removably-mountable holder system for a bicycle comprising:
   an elongate hollow assembly for receiving an object;
   an ancillary lighting assembly in communication with said elongate hollow assembly;
   a female T-slot extending along said elongate hollow assembly for engaging a male T-slot clamp protruding from a frame member of said bicycle; and
   means for axially extending said elongate hollow assembly.

23. An adjustable-length removably-mountable holder system comprising:
   an elongate hollow assembly for receiving an electrical power source therein;
   an ancillary lighting assembly electrically in communication with said elongate hollow assembly;
   a receptacle at the anterior end of said elongate hollow assembly for engaging a tire pump peg protruding from a bicycle frame member; and
   means for axially extending said elongate hollow assembly.

24. An adjustable-length removably-mountable holder system comprising:
   an elongate hollow assembly for receiving at least one battery;
   an ancillary lighting system in communication with said elongate hollow assembly;
   means for electrically interconnecting said battery with said ancillary lighting system;
   means for removably securing said elongate hollow assembly to a structural frame unit of a bicycle, said removably securing means being characterized as comprising an anterior and a posterior engaging block for wedgedly securing said holder system to said structural frame unit of said bicycle; and
   said adjustable-length removably-mountable holder system being characterized as having the length adjustable longitudinally in the direction of said elongate hollow assembly.

25. The holder system of claim 24 wherein said ancillary lighting system is a part of a conduit, rotatably secured to said hollow assembly.

26. The holder system of claim 25 wherein said conduit encases said electrical interconnection between said batteries within said elongate hollow holder and said ancillary lighting assembly.

27. The holder system of claim 24 wherein said electrical interconnection is controlled by a switch.

28. The holder system of claim 1 further comprises an anterior electrical connector and a poster electrical connector on said elongate hollow assembly.

29. The holder system of claim 10 further comprises an anterior electrical connector and a poster electrical connector on said elongate hollow assembly.

30. The holder system of claim 20 further comprises an anterior electrical connector and a poster electrical connector on said elongate hollow assembly.

31. The holder system of claim 22 further comprises an anterior electrical connector and a poster electrical connector on said elongate hollow assembly.

32. The holder system of claim 23 further comprises an anterior electrical connector and a poster electrical connector on said elongate hollow assembly.

33. The holder system of claim 24 further comprises an anterior electrical connector and a poster electrical connector on said elongate hollow assembly.

* * * * *

UNITED STATES PATENT AND TRADEMARK OFFICE
CERTIFICATE OF CORRECTION

PATENT NO. : 5,197,795

DATED : March 30, 1993

INVENTOR(S) : George Mudrovich

It is certified that error appears in the above-identified patent and that said Letters Patent is hereby corrected as shown below:

Col. 2, line 1, delete "." and insert --,--.

Col. 2, line 1, delete "While" and insert --while--.

Col. 2, line 39, between "affixed" and "requires" insert --,--.

Col. 3, line 14, between "another" and "of" insert --object--.

Col. 4, line 27, between "section" and "thereby" insert --,--.

Col. 5, line 22, between "length" and "removably" insert --,--.

Col. 7, line 37, delete "14" and insert -- 114 --.

Col. 8, line 57, delete "3/4" and insert --3/8--.

Col. 9, line 5, delete "is" and insert -- it --.

Col. 9, line 37, delete "2" and insert -- 21 --.

Col. 13, line 39, delete "the" (second occurrence) and insert --their--.

UNITED STATES PATENT AND TRADEMARK OFFICE
CERTIFICATE OF CORRECTION

PATENT NO. : 5,197,795

DATED : March 30, 1993

INVENTOR(S) : George Mudrovich

It is certified that error appears in the above-identified patent and that said Letters Patent is hereby corrected as shown below:

Column 14, line 35, delete "ONE" and insert -- one --.

Column 18, line 22, delete "OF" and insert -- of --.

Signed and Sealed this

Seventh Day of December, 1993

Attest:

BRUCE LEHMAN

Attesting Officer

Commissioner of Patents and Trademarks